(12) United States Patent
Austin et al.

(10) Patent No.: US 8,447,328 B2
(45) Date of Patent: *May 21, 2013

(54) LOCATION ESTIMATION OF A MOBILE DEVICE IN A UMTS NETWORK

(75) Inventors: Mark Austin, Roswell, GA (US); Jeremy Fix, Acworth, GA (US); Sheldon Meredith, Roswell, GA (US); Sarat Puthenpura, Berkeley Heights, NJ (US); Gopal Meempat, East Brunswick, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/870,254

(22) Filed: Aug. 27, 2010

(65) Prior Publication Data

US 2012/0052883 A1 Mar. 1, 2012

(51) Int. Cl.
*H04W 24/00* (2009.01)

(52) U.S. Cl.
USPC .......... 455/456.1; 455/456.2; 455/456.3; 455/404.2; 455/414.1; 455/422.1

(58) Field of Classification Search
USPC ...... 455/456.1, 456.2, 456.3, 404.2; 342/386, 342/357.63, 357.31; 370/310, 328, 338
See application file for complete search history.

(56) References Cited

U.S. PATENT DOCUMENTS

| | | | |
|---|---|---|---|
| 6,307,503 B1 | 10/2001 | Liu | |
| 6,560,567 B1 * | 5/2003 | Yechuri | 703/2 |
| 7,696,922 B2 | 4/2010 | Nicholson | |
| 7,747,258 B2 | 6/2010 | Farmer | |
| 7,917,156 B2 | 3/2011 | Sheynblat | |
| 2010/0195566 A1 * | 8/2010 | Krishnamurthy et al. | 370/328 |
| 2011/0065450 A1 | 3/2011 | Kazmi | |
| 2011/0072034 A1 | 3/2011 | Sly | |
| 2011/0210843 A1 * | 9/2011 | Kummetz | 340/517 |

* cited by examiner

*Primary Examiner* — Kathy Wang-Hurst
(74) *Attorney, Agent, or Firm* — Turocy & Watson, LLP

(57) ABSTRACT

The present disclosure provides devices, systems, and methods to utilize relative timing offset information reported by one or more mobile devices. When coupled with AGPS information reported by one or more mobile devices, the offset information is be used to calibrate calculations and subsequently to locate all 3G mobiles with GPS-like accuracy, whether or not a GPS receiver is available on said mobile device being located. A determination of a propagation delay between one or more cell sites and a mobile device is reported to a network and used to calibrate unknown information such as a timing offset, to improve the accuracy of a detected location. The relative timing offset can be applied to determine a location for all other mobile devices within the area served by the known base station. The present disclosure utilizes this method in conjunction with information crowdsourced from a plurality of mobile devices.

20 Claims, 3 Drawing Sheets

LOCATION ESTIMATION OF A MOBILE DEVICE IN A UMTS NETWORK

BACKGROUND OF THE INVENTION

1. Field of the Invention

The present invention relates to mobile communication systems. In particular, the present invention relates to estimating a location of a mobile device in a UMTS network using crowd-sourced information.

2. Background of the Invention

Mobile devices such as cellular telephones, PDAs, etc. are proliferating like never before. Almost everyone has some sort of mobile device, and some people have multiple devices. Users can access several different networks using a single mobile device, and can access voice, text, and multimedia data from other network entities such as servers and other mobile devices. Further, mobile device complexity is increasing, with more and more advanced and power-efficient processors, display interfaces, and applications to provide a user experience like never before. Such devices include, for instance, the iPhone®, iPad®, Droid®, and other PDAs/netbooks.

These mobile devices additionally include Global Positioning System (GPS) receivers, which provides for a host of location-based services (LBS). Location estimation of mobile devices, in for instance a 3G UMTS system, is important for obtaining location tagged network failure data for system optimization, location based services, 911 services, and a variety of other location enhanced applications. Although GPS receivers enable precise location determinations, GPS receivers do not always receive satellite signals. This problem is highlighted in several situations, for instance in buildings, basements, or generally where the signal from a satellite is blocked for some reason. Estimating accurate (sub 100 m median accuracy) location of 3G mobile devices today typically consists of relying on Assisted (AGPS) devices to achieve the desired accuracy. The problem however, is that mobiles can only report AGPS location estimates if they actually see enough satellites, which essentially limits AGPS locates to mobiles which are "outdoors, in-vehicles or by windows". By some estimates this means that between 30-50% of mobile locates are not able to return AGPS location information.

Commonly owned and assigned patent application Ser. No. 12/712,424 (the NELOS application) describes methods to determine a location of non-GPS mobile devices using network probes that measure timing offsets for base stations pairs and forwards these timing offsets to the mobile device to assist in a location determination. However, this relies on functionality on the network, which may not always be available to the mobile device. Further this does not allow for locating devices serviced by base station pairs that are not operated by the same network operator that owns the network servers.

Consequently, what is needed is a technique to determine a location of a non-GPS mobile device to a precise degree without relying on unnecessary intelligence on the network.

SUMMARY OF THE INVENTION

The present invention provides devices, systems, and methods to utilize relative timing offset information reported by one or more mobile devices. When coupled with AGPS information reported by one or more mobile devices, the offset information is used to calibrate calculations and subsequently to locate all 3G mobiles with GPS-like accuracy, whether or not a GPS receiver is available on said mobile device being located. A similar approach is used in the NELOS (Network Event LOcation System), described in commonly-owned U.S. patent application Ser. No. 12/712, 424 (the NELOS patent), the contents of which are hereby incorporated by reference in their entirety herein in this disclosure. Briefly, signal path compensation is effected through determination of a propagation delay between one or more cell sites and a mobile device. Such determination is based, at least in part, on statistical analysis of the location of mobile devices throughout a coverage sector or cell. Known information about the base stations is used to calibrate unknown information such as a timing offset, to improve the accuracy of a detected location. If any given mobile device is at a particular location, a network operator's base stations are at known locations in terms of latitudes and longitudes, etc. The mobile device measures a timing delay from any given base station. The timing delay is a function of the propagation delay as well as of the timing offset of the base stations. The objective is to solve for the timing offset of the base stations. The NELOS application uses known information generated from mobile devices at known locations. For instance, if a mobile device is aware of their location (via GPS, for instance), and measures the timing offsets, one can determine a propagation delay from the known base stations, and can solve for a relative timing offset. The relative timing offset can be applied to determine a location for all other mobile devices within the area served by the known base station. The present invention utilizes this method in conjunction with information crowd-sourced from a plurality of mobile devices instead of using the information available at the network. Applying the same calculations and calibration methodology solely to handset reported data is a significant improvement over existing technology as it is independent of the need for any network data, and as such can be deployed by companies, phone vendors, or other entities without the need to interact with a network operator.

In one exemplary embodiment, the present invention is a method for determining a location of mobile devices served by a base station pair, the method including receiving a first timing difference of the base station pair from a first mobile device on the network, the first timing difference including a propagation delay determined from a Global Positioning System (GPS) satellite in communication with the first mobile device, determining a timing offset of the base station pair based in part upon the timing different, and in part upon a known location of the base station pair, receiving a second timing difference of the base station pair from a second mobile device on the network, wherein the second mobile device is unable to communicate with a GPS satellite, transmitting a timing offset of the base station pair to the second mobile device, and triangulating a plurality of signals from at least the base station pair and another base station to determine a location of the second mobile device. The method further includes triggering the first mobile device to transmit the first timing difference and the propagation delay. The method further includes receiving a plurality of timing difference reports from a plurality of mobile devices.

In another exemplary embodiment, the present invention is a system for intelligent selection of a Wi-Fi access point from a mobile device, the system including a first mobile device in communication with a GPS satellite, a second mobile device that is unable to communicate with a GPS satellite, a pair of base stations that provide access to a mobile network for both first and second mobile devices, a server on the mobile network, the server including logic to receive a first timing difference of the base station pair from the first mobile device, the first timing difference including a propagation delay determined from the GPS satellite, determine a timing offset of the base station pair based in part upon the timing difference, and in part upon a known location of the base station pair, receive a second timing difference of the base station pair from the second mobile device, and transmit the timing offset of the base station pair to the second mobile device, wherein the second mobile device uses the received timing offset and triangulates a plurality of signals from at least the base station pair and another base station to determine a location for the second mobile device. The system further includes a database on the server that includes a plurality of known locations for a plurality of base stations pairs operated by a network operator. The base station pair may be operated by a third party network operator.

In yet another exemplary embodiment, the present invention is a device for assisting in determining a location of a plurality of mobile devices on a network, the device including a processor, a memory coupled to the processor, a network interface coupled to the processor, a GPS transceiver coupled to the processor, and logic on the memory to measure a first timing difference of the base station pair and a propagation delay determined from a GPS satellite, transmit the first timing difference and the propagation delay to along with a location of the device to a server on the network, wherein the server computes a timing offset of the base station pair based in part upon the timing difference, and in part upon a known location of the base station pair, and wherein a second mobile device receives the timing offset, and uses the timing offset with a second timing difference measured at the second mobile device to determine a location of the second mobile device. The second mobile device uses the received timing offset and triangulates a plurality of signals from at least the base station pair and another base station to determine the location for the second mobile device. A user interface enables a user to determine a location of the mobile device, and transmit the location along with the measured timing difference and propagation delay to the server.

DETAILED DESCRIPTION OF THE INVENTION

Figure 1:
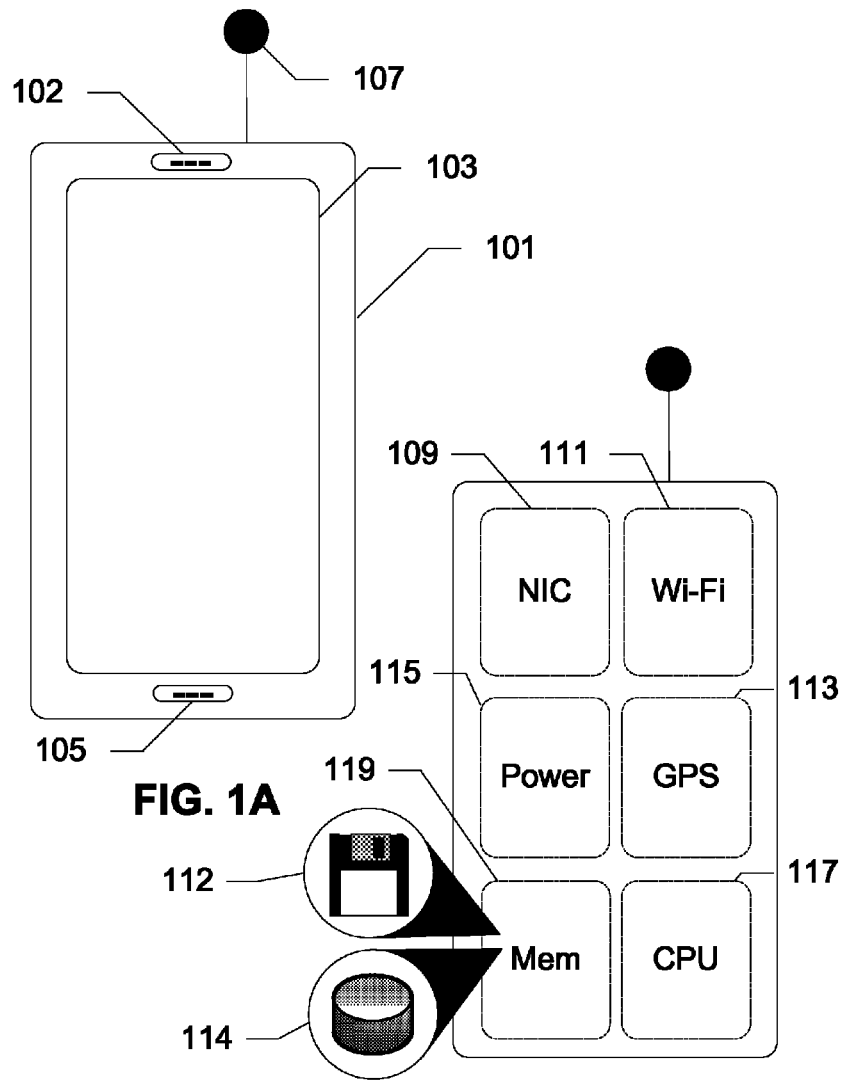
FIGS. 1A and 1B respectively show the external and internal components of a mobile device, according to an exemplary embodiment of the present invention.

The present invention provides devices, systems, and methods to utilize relative timing offset information reported by one or more mobile devices. When coupled with AGPS information reported by one or more mobile devices, the offset information is be used to calibrate calculations and subsequently to locate all 3G mobiles with GPS-like accuracy, whether or not a GPS receiver is available on said mobile device being located. A similar approach is used in the NELOS (Network Event LOcation System), described in commonly-owned U.S. patent application Ser. No. 12/712, 424 (the NELOS patent). Briefly, signal path compensation is effected through determination of a propagation delay between one or more cell sites and a mobile device. Such determination is based, at least in part, on statistical analysis of the location of mobile devices throughout a coverage sector or cell. Known information about the base stations is used to calibrate unknown information such as a timing offset, to improve the accuracy of a detected location. If any given mobile device is at a particular location, a network operator's base stations are at known locations in terms of latitudes and longitudes, etc. The mobile device measures a timing delay from any given base station. The timing delay is a function of the propagation delay as well as of the timing offset of the base stations. The objective is to solve for the timing offset of the base stations. The NELOS application uses known information generated from mobile devices at known locations. For instance, if a mobile device is aware of their location (via GPS, for instance), and measures the timing offsets, one can determine a propagation delay from the known base stations, and can solve for a relative timing offset. The relative timing offset can be applied to determine a location for all other mobile devices within the area served by the known base station. The present invention utilizes this method in conjunction with information crowd-sourced from a plurality of mobile devices instead of using the information available at the network. Applying the same calculations and calibration methodology solely to handset reported data is a significant improvement over existing technology as it is independent of the need for any network data, and as such can be deployed by companies, phone vendors, or other entities without the need to interact with a network operator.

"Mobile device", as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a wireless network, or a wireline network. A "network" can include broadband wide-area networks such as cellular networks, local-area networks (LAN), wireless LAN (Wi-Fi), and personal area networks, such as near-field communication (NFC) networks including BLUETOOTH®. Communication across a network is preferably packet-based; however, radio and frequency/amplitude modulations networks can enable communication between communication devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH®transceiver for communicating with a BLUETOOTH® device.

A network typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information. A server may communicate with other servers on different networks to update a user account.

A "location", as used herein and throughout this disclosure, is any physical location that is served by one or more networks. A mobile device has a "location" that can be determined via a plurality of methods such as Global Positioning System (GPS), Assisted GPS (A-GPS), cell tower triangulation, RF signatures, etc. and as described below. A lane on a road can be a location. A toll booth can be a location. A location may include a geo-fence. A geo-fence is a virtual perimeter around a location such that when a smart vehicle enters or exits the location, a notification is generated. A location can generally be determined using radio-location via signal measurement from base stations/cell towers, using GPS/A-GPS, or using proximity to NFC transceivers. Determining a location as a function of time enables a measurement of rate of movement, or speed.

For the purposes of the present invention, the terms cell tower, cell site, base station, and nodeB are used interchangeably and generally refer to an access point that provides access to the cellular network for a mobile device having a cellular transceiver.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B respectively show the external and internal components of a mobile device, according to an exemplary embodiment of the present invention. Mobile device 101 includes a speaker 102, a display 103, a microphone 105, and an antenna 107. Mobile device 101 further includes a network interface (NIC) 109, a Wi-Fi transceiver 111, a Global Positioning System (GPS) receiver 113, a power supply 115, a central processing unit (CPU) 117, and a memory 119. Speaker 102 provides an audio output for mobile device 101. Display 103 is an LCD or LED or other type of display on which a user can view selections, numbers, letters, etc. Display 103 can also be a touchscreen, thereby being used as an input device. In embodiments not using a touchscreen, a keypad is typically used as an input device, for instance, to type a phone number or a message. Such a keypad may be a numerical keypad, a QWERTY keyboard, etc. Microphone 105 allows the user to verbally communicate with others using mobile device 101. Antenna 107 is a transducer designed to transmit or receive electromagnetic waves to and from a network. In conjunction with antenna 107, network interface 109 allows mobile device 101 to wirelessly communicate with a cellular network, or with other wireless devices across the cellular network. Network interface 109 may be a cellular transceiver, wireless transceiver, etc., and includes combinations of transceivers to communicate with assorted wireless networks. Wi-Fi transceiver 111 enables mobile device 101 to wirelessly communicate over short ranges with a Wi-Fi access point, and through the access point, to a packet-based network such as the Internet, and other devices on the Internet. GPS transceiver 113 enables a determination of a location of mobile device 101, by receiving signals from a GPS satellite. In addition to these signals, network interface 109 can receive assistance data from an A-GPS server on the cellular network, thereby enabling GPS receiver 113 to get a faster "fix" on a satellite signal. Power supply 115 provides power to each of the components of mobile device 101, and can include a battery, as well as an interface to an external power supply. CPU 117 controls components of mobile device 101 according to instructions in logic stored on memory 119. Memory 119 comprises any computer readable medium, such as RAM, ROM, etc. Memory 119 stores logic 112, in addition to logic for operating the components of mobile device 101. Memory 119 further stores a database 114 including a record for base station pairs and their associated timing offsets. This database is useful for estimating a location that mobile device 101 has already been in, so as to minimize the load on the network to download additional timing offsets that are not required. Further, the record of base station pairs may include timing differences to be uploaded to a server at a later time or as and when required.

Logic 112 includes measuring logic to measure a timing delay from any given base station. The timing delay is a function of the propagation delay as well as of the timing offset of the base stations. The objective is to solve for the timing offset of the base stations. For instance, if mobile device 101 is aware of their location (via signals received at GPS receiver 113, for instance), and measures the timing offsets, one can determine a propagation delay from the known base stations, and can solve for a relative timing offset. The relative timing offset can be applied to determine a location for all other mobile devices within the area served by the known base station. The present invention utilizes this method in conjunction with information crowd-sourced from a plurality of mobile devices. The calculation is as follows. Logic 112 observes an Observed Time Difference (OTD) measurement from a particular cell i that is a function of a measurement of a received Superframe number $SFN_i$ to its Connection Frame Number (CFN) measured in chips. More detail about these values can be found in 3G Partnership Project Technical Spec 25.215-830, section 5.1.8, "SFN-CFN observed time difference," hereinafter referred to as 3gpp01.

$$OTD_i = OFF_i * 33,400 + T_{mi} = SFN_i - CFN \quad (1)$$

In equation (1), $OFF_i$, is the measured $SFN_i$ to CFN offset in frames, and $T_{mi}$ is the offset in chips, both of which are measurements available to mobile device 101 with respect to a cell i. The right hand side of equation (1) is a function of the transport and propagation delay, so that equation (1) can be written as (see, for instance, 3gpp01):

$$OTD_i = T_{Ue} - (T_i + \tau_i) \quad (2)$$

Where $T_{Ue}$ denotes the time reference at a mobile device, $T_i$ denotes the transport offset for cell i to the mobile device, and $\tau_i$ denotes the propagation delay for cell i. Consequently, for two cells i and j and a given mobile device m1 we have:

$$OTD_i(m1) = T_{Ue}(m1) - (T_i \tau_i(m1))$$

$$OTD_j(m1) = T_{Ue}(m1) - (T_j \tau_j(m1))$$

So that, $$OTD_j(m1) - OTD_i(m1) = T_i - T_j \tau_i(m1) - \tau_j(m1) \quad (3)$$

If $O_{ji}(m)$ denotes the time difference in the arrivals of signals from cells i and j, as observed by a mobile device m (i.e., $O_{ji}(m) = OTD_j(m) - OTD_i(m)$), then $$O_{ji}(m1) = T_{ij} + \tau_{ij}(m1) \quad (4)$$

In equation (4), both $T_{ij}$ and $\tau_{ij}(m1)$ are unknown. At this point, a mobile device m2 which happens to also be between the same two base stations, i and j, which also has AGPS measurements reported (for instance, mobile device 101 receiving GPS signals), the provision of $\tau_{ij}(m2)$ allows one to calculate $T_{ij}$ as $$T_{ij} = o_{ji}(m2) - \tau_{ij}(m2) \quad (5)$$

$T_{ij}$ is common to all mobile devices between base stations i and j, so that, as long as one AGPS measurement can be captured from mobile device 101, it can be used to calculate ("calibrate") the $T_{ij}$ component common to all mobile devices between these two base stations, and a location for all the mobile devices can be calculated with the same AGPS accuracy. This calculation can occur on a server on the network.

Pursuant to any prior contractual arrangement between a user of mobile device 101 and the network operator, logic on the network (on an application server, for instance) has the ability operate GPS receiver 113 and to command/request, for instance, a "snapshot" of the location of mobile device 101. This provides a network operator or other entity the ability to dynamically determine locations of devices that are accessing the various network access points. The resulting reports can be used to generate a "map" of Wi-Fi coverage for the network. Combined with information on RF fingerprinting of cell sites described in the NELOS patent, this offers a network operator with a heightened level of awareness as to how different aspects of their network are operating.

As described above, provided a mobile device has access to a GPS satellite, there is no need to obtain better accuracy (i.e. $\tau_{ij}$ is known from AGPS), however, good location estimation is needed when mobile devices do not have access to satellites. This requires accurately calculating the propagation delays ($\tau_{ij}$) for a given mobile device. In one exemplary embodiment, $\tau_{ij}$ can be calculated using a self-calibrating approach. At one point in time, say before walking into a building from the parking lot, a mobile device has access to AGPS location information, as well as visibility to the same cell sites. Assuming the mobile device captured the AGPS information when it had it, and that it knows the base station/cell locations as described above, (i.e., it has $\tau_{ij}$), and it measured $O_{ji}$ at the same time, then $T_{ij}$ could have been stored in the database 114, using Equation (5). Consequently, when the mobile device loses AGPS thereafter (e.g. the user moves inside the building), all that logic 112 needs to do is to use the stored $T_{ij}$ along with $O_{ji}$ in Eqn. (5) to calculate $\tau_{ij}$. Now, if the mobile device can do this similarly for another base station pair, then standard triangulation approaches known in the art can be used to locate the mobile geographically.

Moreover, the present invention also provides for a crowd-sourced approach. At least one mobile device per base station shares relevant AGPS and $O_{ji}$, or computed $T_{ij}$ via Eqn (5) information when available to a central server. Then, mobile devices that do not have AGPS, and need an estimate of $T_{ij}$, can query the central server to collect the shared $T_{ij}$ database, and then these mobile devices can use Eqn (5) to calculate $T_{ij}$, and hence using another base station pair to perform triangulation.

Figure 2:
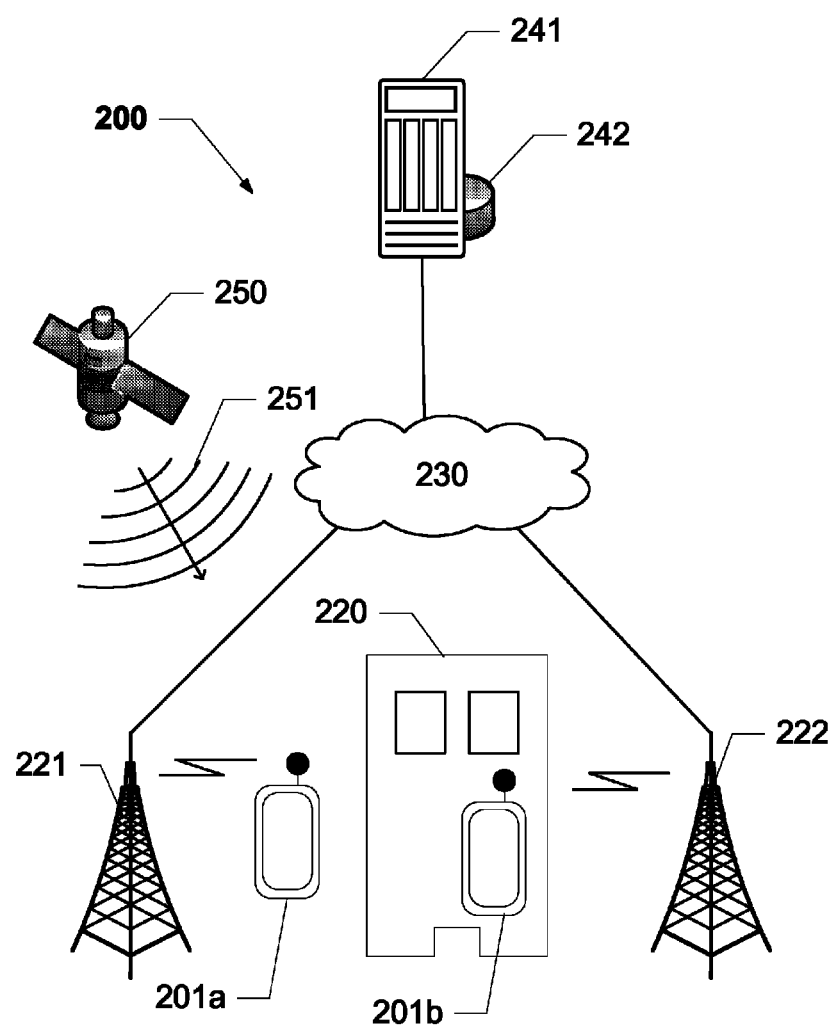
FIG. 2 shows a system for determining the location of a mobile device, according to an exemplary embodiment of the present invention.

FIG. 2 shows a system 200 for determining a location of a mobile device, according to an exemplary embodiment of the present invention. Mobile devices 201a and 201b are served by a pair of base stations/cell sites 221 and 222. However, mobile device 201b is inside building 220, and therefore is unable to receive a satellite signal 251 from satellite 250. Mobile device 201a is able to receive satellite signal 251. Cell sites 221 and 222 provide network access to cellular network 230. Other elements of cellular network 230 are known in the art and therefore not described, such as routers, gateways, nodes, and other servers. At a back end of cellular network 230 is a server 241, such as an application server, or location server. Server 241 includes storage 242 that stores, among other things, logic, and a database of known locations for cell sites 221 and 222.

In operation, mobile device 201a, using AGPS, provides critical timing measurements $T_{ij}$ to server 241 for a given cell site pair 221, 222, while mobile device 201b receives the timing information $T_{ij}$ from server 241 via network 230 in order to accurately calculate its location. For this method to work, it is assume that server 241 has $T_{ij}$'s for every base station pair i and j. There are a variety of ways to do this, including receiving reports from mobile devices of the computed $T_{ij}$ or equivalent, every time they a base station pair is connected to, while having access to AGPS. This reporting could be initiated by a command from server 241, or pre-programmed into logic on the mobile device itself to periodically report $T_{ij}$ for a base station pair. The server 241 acts as a central repository of $T_{ij}$ values for base stations pairs and is regularly updated and queried by "cooperating mobile devices". As mentioned earlier, these same $T_{ij}$ values are used to "calibrate" NELOS, which in then turn uses reported $O_{ji}$ values measured from the network probes to locate all 3G mobiles. However, if an AGPS measurement for a given base station pair ij, is not available, then server 241 requests AGPS measurement from a mobile device such as device 201a in the vicinity of the base station pair ij, so that it can calculate $T_{ij}$ for reference in its database.

There are a variety of ways to calculate relevant base station locations, either via brute force, driving around, and using signal strength/time delay triangulation to locate them, using a lookup of public database, or a crowd sourced approach. In the crowd sourced approach of the present invention, multiple AGPS measurements coupled with $\tau_{ij}$ measurements from multiple mobiles are available. This presents an "inverse problem" for finding the locations of the base stations, and can be solved as follows. Continuing from Equations (4) and (5) above, for a large collection of mobiles $m_1, m_2, m_3, \ldots, m_N$ with random (but known and distinct) geographical positions, one can derive the following system of relations:

$$O_{ji}(m_1) = T_{ij} + \tau_{ij}(m_1)$$
$$O_{ji}(m_2) = T_{ij} + \tau_{ij}(m_2)$$
$$\vdots$$
$$O_{ji}(m_N) = T_{ij} + \tau_{ij}(m_N)$$

Denoting the velocity of propagation of light by c, the above relations may be expressed in terms of the differential distances as shown below:

$$d_{ij}(m_1) = Q_{ji}(m_1) - R_{ij} \quad (6)$$
$$d_{ij}(m_2) = Q_{ji}(m_2) - R_{ij}$$
$$\vdots$$
$$d_{ij}(m_N) = Q_{ji}(m_N) - R_{ij}$$

where $O_{ji}(m_l)=c \times O_{ji}(m_l)$, $l=1, \ldots, N$ are a set of known parameters, and $R_{ij}=c \times T_{ij}$ is an unknown. This leads to the following (possibly over-determined) set of N relations:

$$\sqrt{(x_i - x_{m_1})^2 + (y_i - y_{m_1})^2} - \sqrt{(x_j - x_{m_1})^2 + (y_j - y_{m_1})^2} = \quad (7)$$
$$Q_{ji}(m_1) - R_{ij}$$
$$\sqrt{(x_i - x_{m_2})^2 + (y_i - y_{m_2})^2} - \sqrt{(x_j - x_{m_2})^2 + (y_j - y_{m_2})^2} =$$
$$Q_{ji}(m_2) - R_{ij}$$
$$\vdots$$
$$\sqrt{(x_i - x_{m_N})^2 + (y_i - y_{m_N})^2} -$$
$$\sqrt{(x_j - x_{m_N})^2 + (y_j - y_{m_N})^2} = Q_{ji}(m_N) - R_{ij}$$

where $(x_-, y_-)$ designate the geographical location of the mobile device in question (approximated in the Cartesian coordinate system). Note that barring the five unknowns $\{x_i, y_i, x_j, y_j, R_{ij}\}$, all the other parameters in the above system of relations are known. The objective here is to compute a least mean squared estimate for the unknowns $\{x_i, y_i, x_j, y_j, R_{ij}\}$. Thus, for a candidate choice of the unknown vector $[x_i, y_i, x_j, y_j, R_{ij}]$, an error function E is defined as $$E(x_i, y_i, x_j, y_j, R_{ij}) = \sum_{l=1}^{N} [\sqrt{(x_i - x_{m_l})^2 + (y_i - y_{m_l})^2} - \quad (8)$$
$$\sqrt{(x_j - x_{m_l})^2 + (y_j - y_{m_l})^2} - (Q_{ji}(m_l) - R_{ij})]^2$$

Assuming convexity of the function $E(x_i, y_i, x_j, y_j, R_{ij})$, the optimal values of the unknowns $\{x_i^*, y_i^*, x_j^*, y_j^*, R_{ij}^*\}$ that minimize the error is obtained by the set of relations, $$\frac{\partial E}{\partial x_i^*} = 0; \frac{\partial E}{\partial y_i^*}; \frac{\partial E}{\partial x_j^*} = 0; \frac{\partial E}{\partial y_j^*} = 0; \frac{\partial E}{\partial R_{ij}^*} = 0 \quad (9)$$

This leads to the following system of five non-linear equations in five unknowns:

$$\sum_{l=1}^{N} \left\{ (x_i^* - x_{m_l}) \left[ 1 - \frac{Q_{ji}(m_l) - R_{ij}^* + \sqrt{(x_j^* - x_{m_l})^2 + (y_j^* - y_{m_l})^2}}{\sqrt{(x_j^* - x_{m_l})^2 + (y_i^* - y_{m_l})^2}} \right] \right\} = \quad (10)$$
$$0$$

-continued $$\sum_{l=1}^{N} \left\{ (y_i^* - y_{m_l}) \left[ 1 - \frac{Q_{ji}(m_l) - R_{ij}^* + \sqrt{(x_j^* - x_{m_l})^2 + (y_j^* - y_{m_l})^2}}{\sqrt{(x_j^* - x_{m_l})^2 + (y_i^* - y_{m_l})^2}} \right] \right\} =$$
$$0$$

$$\sum_{l=1}^{N} \left\{ (x_j^* - x_{m_l}) \left[ 1 + \frac{Q_{ji}(m_l) - R_{ij}^* - \sqrt{(x_i^* - x_{m_l})^2 + (y_i^* - y_{m_l})^2}}{\sqrt{(x_j^* - x_{m_l})^2 + (y_j^* - y_{m_l})^2}} \right] \right\} =$$
$$0$$

$$\sum_{l=1}^{N} \left\{ (y_j^* - y_{m_l}) \left[ 1 + \frac{Q_{ji}(m_l) - R_{ij}^* - \sqrt{(x_i^* - x_{m_l})^2 + (y_i^* - y_{m_l})^2}}{\sqrt{(x_j^* - x_{m_l})^2 + (y_j^* - y_{m_l})^2}} \right] \right\} =$$
$$0$$

$$\sum_{l=1}^{N} [\sqrt{(x_i^* - x_{m_l})^2 + (y_i^* - y_{m_l})^2} -$$
$$\sqrt{(x_j^* - x_{m_l})^2 + (y_j^* - y_{m_l})^2} - (Q_{ji}(m_l) - R_{ij}^*)] = 0$$

This system of equations (10) may be solved via a technique such as the Newton-Raphson method, to yield the least mean squared error estimates for the geographical locations of the cell sites i and j, $\{x_i^*, y_i^*, x_j^*, y_j^*, R_{ij}^*\}$.

Figure 3:
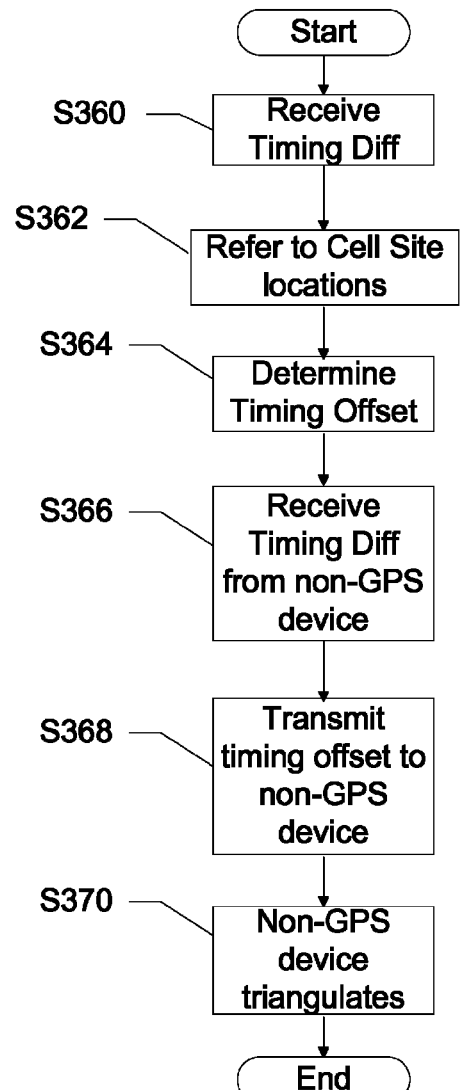
FIG. 3 shows a method for determining the location of a mobile device, according to an exemplary embodiment of the present invention.

FIG. 3 shows a method for determining a location of a mobile device, according to an exemplary embodiment of the present invention. As described above, a logic on either the mobile device or the network triggers the transmission S360 of a first timing difference of the base station pair from a first mobile device on the network, the first timing difference including a propagation delay determined from a Global Positioning System (GPS) satellite in communication with the first mobile device. The server refers to cell site locations S362 stored on a local database, or additionally reported by a plurality of mobile devices or other network nodes, to determine S364 a timing offset of the base station pair based in part upon the timing difference, as shown in the equations above. The server receives a second timing difference S366 of the base station pair from a second mobile device on the network, wherein the second mobile device is unable to communicate with a GPS satellite for any number of reasons identified above. The server transmits a timing offset of the base station pair to the second mobile device S368, wherein the second mobile devices triangulates S370 a plurality of signals from at least the base station pair and another base station to determine a location of the second mobile device. Optionally, the first mobile device may be triggered to transmit the first timing difference and the propagation delay at fixed or specified intervals. Optionally, a Newton-Raphson method can be employed as described above to yield a geographical location of the cell site pair.

According to embodiments of the present invention, updating the cellular network may also send the network an RF fingerprint for the current location of the mobile device, this location being determined through GPS, etc. The cellular network can update databases on servers with this new information to make further determinations of location more accurate, especially for devices lacking GPS capabilities. Further, the intelligence may take into account a subscriber density, or a number of subscribers per cell sector, and use this information to balance the load between cell towers. The logic can be on a server on the network, on the mobile devices themselves, and any combination thereof. Moreover, a network operator can partner with a third party network operator or service provider, whereby the third party installs a reporting and detection application on a mobile device. The application would enable the mobile device to report O and T values to the network operator's server, regardless of which base station/cell tower pair the mobile device is connected to. This helps to calibrate Using locations of the cell sites, a triangulation method can be employed in conjunction with the reported O and T values to determine a more specific location for other mobile devices served by the base station pair. Other combinations are possible and will be apparent to one skilled in the art in light of this disclosure.

The foregoing disclosure of the preferred embodiments of the present invention has been presented for purposes of illustration and description. It is not intended to be exhaustive or to limit the invention to the precise forms disclosed. Several variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method, comprising:
   receiving, by a system comprising a processor, computed timing difference information for a base station device pair, comprising a first and second base station device associated with a network, and a first mobile device on a network, the computed timing difference information based on a propagation delay determined from global positioning system information for the first mobile device and known locations of base station devices comprising the base station device pair;
   determining, by the system, timing offset information for the base station device pair relative to the first mobile device based on a difference between first measured timing difference information and the computed timing difference information;
   receiving, by the system, second measured timing difference information for the base station device pair from a second mobile device on a network; and
   determining, by the system, a location of the second mobile device based in part on the timing offset information for the base station device pair and the second measured timing difference information.

2. The method of claim 1, further comprising instructing, by the system, the first mobile device to transmit the first computed timing difference information.

3. The method of claim 1, wherein the base station device pair operates on a network that serves the first and second mobile devices.

4. The method of claim 1, wherein the base station device pair operates on a network that does not serve the first mobile device.

5. The method of claim 1, further comprising storing, by the system, the first computed timing difference information on a data store.

6. The method of claim 1, further comprising storing, by the system, the timing offset information on a data store.

7. The method of claim 1, further comprising employing, by the system, Newton-Raphson processing to determine a least mean squared error estimate for a geographical locations of the first and second base station device of the base station device pair.

8. The method of claim 1, further comprising receiving, by the system, a plurality of timing difference information, comprising the first computed timing difference information and the second measured timing difference information, for a plurality of mobile devices.

9. A system comprising:
   a memory to store instructions; and
   a processor, coupled to the memory, that facilitates execution of the instructions to perform operations, comprising:
      receiving global positioning system information for a first mobile device;
      receiving first measured timing difference information associated with a measured propagation delay of a signal between a base station device pair, comprising a first and second base station device associated with a network, and the first mobile device;
      determining timing offset information for the base station device pair based on the first measured timing difference information, the global positioning system information for the first mobile device, and defined locations of the base stations comprising the base station device pair;
   receiving second measured timing difference information associated with another measured propagation delay of another signal between the base station device pair and a second mobile device; and
   determining a location for the second mobile device based in part on the timing offset information for the base station device pair and the second measured timing difference information.

10. The system of claim 9, further comprising receiving another timing offset information from a data store that comprises a plurality of defined locations for a plurality of base station device pairs comprising the base station device pair.

11. The system of claim 9, wherein the receiving the first measured timing difference information is in response to instructing the first mobile device to transmit the first measured timing difference information.

12. The system of claim 9, wherein the base station device pair operates on a different network than a network serving the first mobile device.

13. The system of claim 9, further comprising storing the first measured timing difference information on a data store.

14. The system of claim 9, further comprising storing the timing offset information on a data store.

15. The system of claim 9, wherein the base station device pair comprises a nodeB device.

16. A mobile device, comprising:
   a memory to store instructions; and
   a processor, coupled to the memory, that facilitates execution of the instructions to perform operations comprising:
      receiving first measured timing difference information between a base station device pair, comprising a first and second base station device associated with a network, and another mobile device, the first timing difference information comprising a measured propagation delay for a signal transmitted between the other mobile device and the base station devices comprising the base station device pair;

receiving base station device pair location information for known locations of the base station devices comprising the base station device pair;

receiving location information for the other mobile device determined from global positioning system information for the other mobile device;

determining predicted timing difference information between the base station device pair and the other mobile device based on the base station device pair location information and the location information for the other mobile device;

determining timing offset information of the base station device pair based on the first measured timing difference information and the predicted timing difference information; and determining a location for the mobile device based on the timing offset information and second measured timing difference information measured between the mobile device and the base station device pair.

17. The mobile device of claim 16, wherein the operations further comprise storing a plurality of timing offset information for a plurality of base station device pairs to facilitate determining the location of the mobile device.

18. The mobile device of claim 16, wherein the operations further comprise displaying the location of the mobile device.

19. The mobile device of claim 16, wherein the operations further comprise storing a plurality of timing difference information between a plurality of base station device pairs and other mobile devices.

20. The mobile device of claim 1, wherein the operations further comprise receiving other timing offset information for another base station device pair to facilitate the determining the location of the mobile device.

* * * * *